(12) United States Patent
Fukuda

(10) Patent No.: US 7,787,143 B2
(45) Date of Patent: Aug. 31, 2010

(54) JOB INFORMATION MANAGEMENT METHOD AND APPARATUS

(75) Inventor: Hiroki Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1399 days.

(21) Appl. No.: 10/699,923

(22) Filed: Nov. 4, 2003

(65) Prior Publication Data

US 2004/0133890 A1 Jul. 8, 2004

(30) Foreign Application Priority Data

Nov. 27, 2002 (JP) ............................. 2002-344577

(51) Int. Cl.
    G06K 15/00 (2006.01)
(52) U.S. Cl. .................. 358/1.16; 358/1.1; 358/1.6; 358/1.15; 358/1.17; 358/1.18; 718/100
(58) Field of Classification Search .................. 358/1.1, 358/1.9, 2.1, 3.23, 1.15–1.18, 1.6; 718/100
    See application file for complete search history.

(56) References Cited

U.S. PATENT DOCUMENTS

| 5,580,177 | A | * | 12/1996 | Gase et al. ..................... 400/61 |
| 6,718,378 | B1 | | 4/2004 | Machida |
| 6,809,831 | B1 | * | 10/2004 | Minari ....................... 358/1.15 |
| 6,864,992 | B1 | * | 3/2005 | Okada ....................... 358/1.15 |
| 7,027,175 | B2 | * | 4/2006 | Robertson .................. 358/1.15 |
| 2003/0007179 | A1 | * | 1/2003 | Ferlitsch .................... 358/1.16 |

FOREIGN PATENT DOCUMENTS

| JP | 2-247745 | 10/1990 |
|---|---|---|
| JP | 2227746 | 10/1990 |
| JP | 5274190 | 10/1993 |
| JP | 8263239 | 10/1996 |
| JP | 9-188007 | 7/1997 |
| JP | 11203068 A | 7/1999 |
| JP | 2001014255 A | 1/2001 |
| JP | 2001-34431 | 2/2001 |
| JP | 2001-282475 | 10/2001 |
| JP | 2001344089 | 12/2001 |
| JP | 2002-14791 | 1/2002 |
| JP | 2002-23988 | 1/2002 |
| JP | 200273462 | 3/2002 |
| JP | 2002-116899 | 4/2002 |
| JP | 2002116835 | 4/2002 |
| JP | 2002-144679 | 5/2002 |
| JP | 2002-244788 | 8/2002 |
| JP | 2000244788 | 8/2002 |
| JP | 2002259106 A | 9/2002 |

* cited by examiner

Primary Examiner—King Y Poon
Assistant Examiner—Lawrence E Wills
(74) Attorney, Agent, or Firm—Fitzpatrick, Cella, Harper & Scinto

(57) ABSTRACT

This invention increases the job information management precision. To accomplish this, an information processing method of recording or accumulating job information on a job issued from an information processing apparatus connectable to an image forming apparatus including an acquisition step of acquiring the job information from the information processing apparatus or the image forming apparatus, a determination step of determining whether to record or accumulate the job information acquired in the acquisition step, in accordance with a driver which generates data of the issued job, and a recording/accumulation step of recording or accumulating the job information determined in the determination step to be recorded or accumulated.

6 Claims, 22 Drawing Sheets

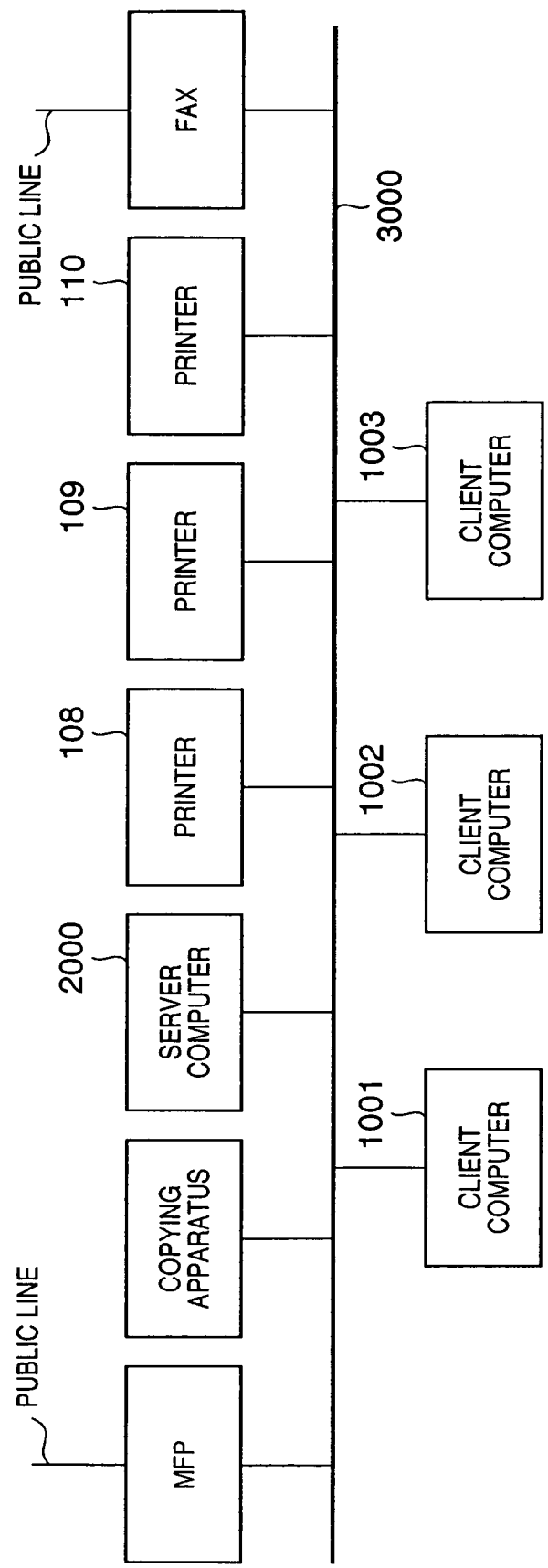

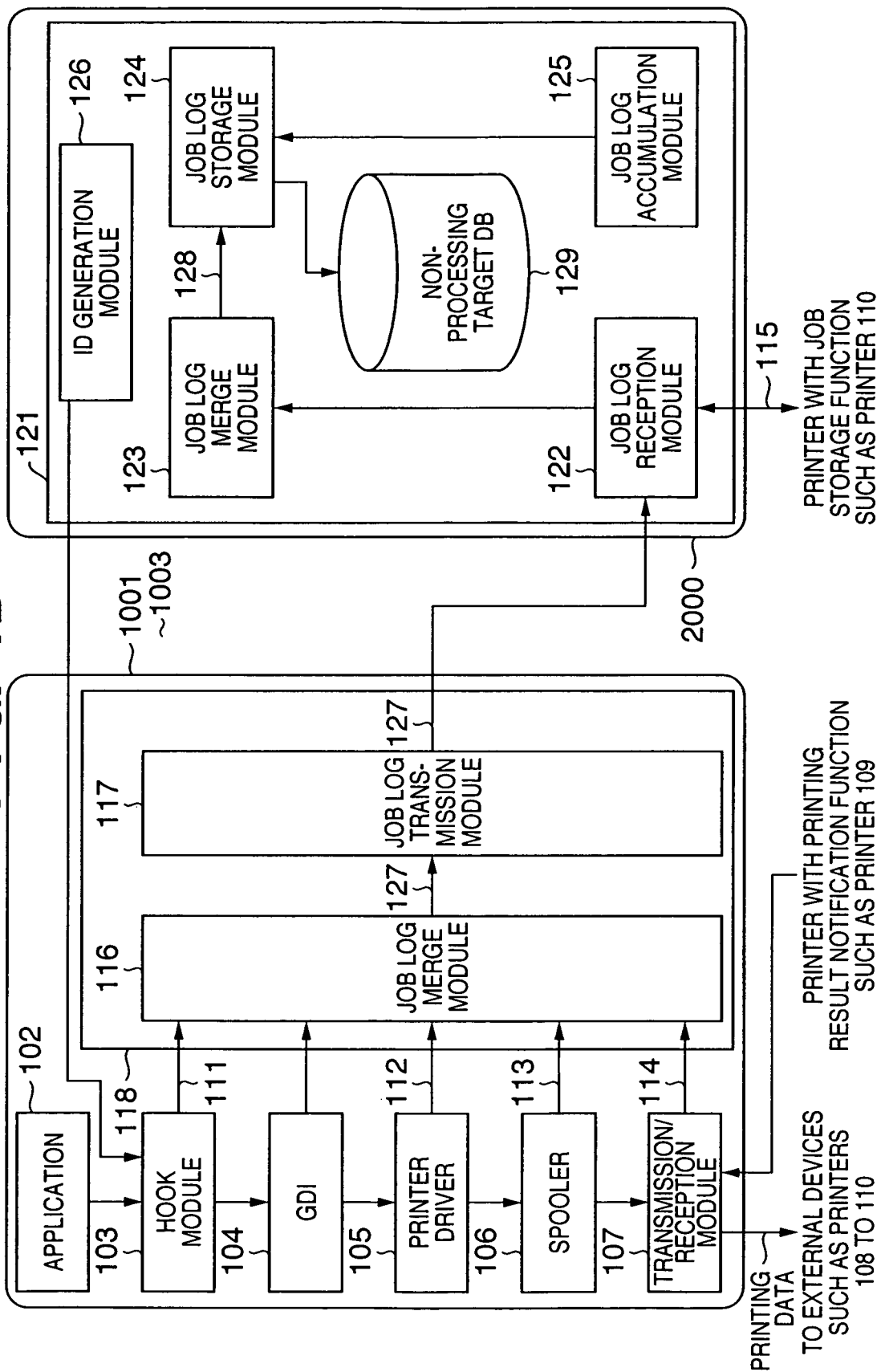

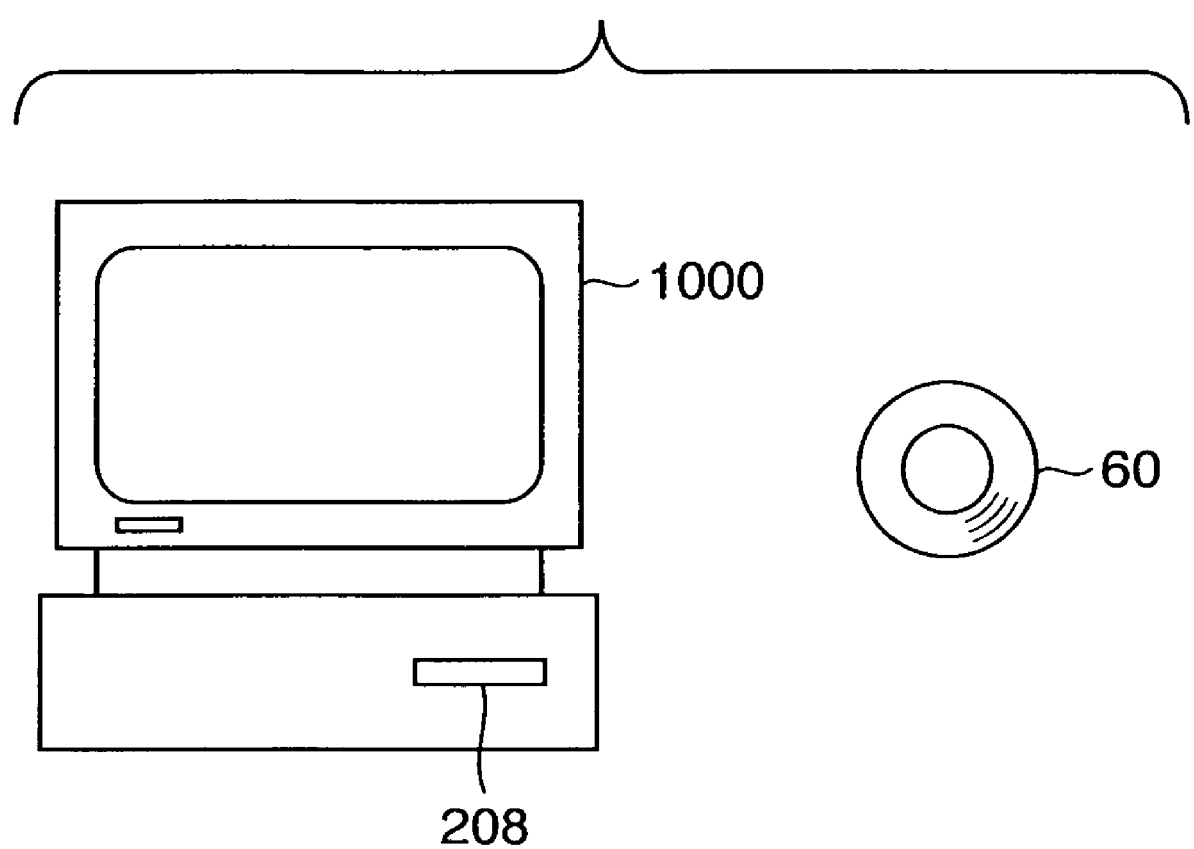
F I G. 6

FIG. 7

| JobID | 520 |
|---|---|
| APPLICATION NAME | Word MASTER |
| NUMBER OF LOGICAL PAGES | 9 |
| DOCUMENT NAME | abcd0001 |
| ORIGINAL DOCUMENT NAME | 2001 ANNUAL REPORT |
| PROCESSED | NO |
| TYPE | HOOK |
| START TIME | 2001/12/20 21:11 |
| END TIME | 2001/12/20 21:21 |

FIG. 8

| JobID | 520 |
|---|---|
| PAPER SIZE | A4 |
| N-up | 4 |
| NUMBER OF BULL-VALUE PAGES | 3 |
| DOUBLE-/SINGLE-SIDED PRINTING | TWO SIDES |
| PROCESSED | NO |
| TYPE | DRIVER |
| PORT NAME | IP_10.166.30.2 |
| PRINTER DRIVER NAME | Acrobad writer 3.0 |
| START TIME | 2001/12/20 21:21 |
| END TIME | 2001/12/20 21:31 |

FIG. 9

| JobID | 520 |
|---|---|
| OWNER NAME | YAMADA |
| SPOOL DATA SIZE | 56789 |
| NUMBER OF PHYSICAL PAGES | 3 |
| DOUBLE-/SINGLE-SIDED PRINTING | TWO SIDES |
| PROCESSED | NO |
| TYPE | API |
| START TIME | 2001/12/20 21:31 |
| END TIME | 2001/12/20 21:41 |

FIG. 10

| JobID | 520 |
|---|---|
| PROCESSED | NO |
| TYPE | MONITOR |
| START TIME | 2001/12/20 21:41 |
| END TIME | 2001/12/20 21:51 |

FIG. 12

| JobID | 520 |
|---|---|
| APPLICATION NAME | Word MASTER |
| NUMBER OF LOGICAL PAGES | 9 |
| DOCUMENT NAME | abcd0001 |
| ORIGINAL DOCUMENT NAME | 2001 ANNUAL REPORT |
| PROCESSED | NO |
| TYPE | MERGE |
| START TIME | 2001/12/20 21:11 |
| END TIME | 2001/12/20 21:21 |
| PAPER SIZE | A4 |
| N-up | 4 |
| NUMBER OF PHYSICAL PAGES | 3 |
| DOUBLE-/SINGLE-SIDED PRINTING | TWO SIDES |
| OWNER NAME | YAMADA |
| SPOOL DATA SIZE | 56789 |
| PORT NAME | IP_10.166.30.2 |
| PRINTER DRIVER NAME | Acrobad writer 3.0 |

FIG. 13

| JobID | 520 |
|---|---|
| NUMBER OF DELIVERY PAGES | 3 |
| NUMBER OF DELIVERY SHEETS | 2 |
| PROCESSED | NO |
| TYPE | PRINTER |
| START TIME | 2001/12/20 22:01 |
| END TIME | 2001/12/20 22:11 |
| DOCUMENT NAME | abcd0001 |

FIG. 14

| JobID | 520 |
|---|---|
| NUMBER OF DELIVERY PAGES | 3 |
| NUMBER OF DELIVERY SHEETS | 2 |
| PROCESSED | NO |
| TYPE | PRINTER |
| START TIME | 2001/12/20 22:01 |
| END TIME | 2001/12/20 22:11 |
| DOCUMENT NAME | 2001 ANNUAL |

FIG. 17

| | |
|---|---|
| JobID | 520 |
| APPLICATION NAME | Word MASTER |
| NUMBER OF LOGICAL PAGES | 9 |
| DOCUMENT NAME | abcd0001 |
| PROCESSED | NO |
| TYPE | MERGE |
| START TIME | 2001/12/20 21:11 |
| END TIME | 2001/12/20 21:21 |
| PAPER SIZE | A4 |
| N-up | 4 |
| NUMBER OF PHYSICAL PAGES | 3 |
| DOUBLE-/SINGLE-SIDED PRINTING | TWO SIDES |
| OWNER NAME | YAMADA |
| SPOOL DATA SIZE | 56789 |
| PORT NAME | IP_10.166.30.2 |
| PRINTER DRIVER NAME | Acrobad writer 3.0 |
| NUMBER OF DELIVERY PAGES | 3 |
| NUMBER OF DELIVERY SHEETS | 2 |

FIG. 20

ADD/DELETE PORT AND DRIVER  ☒

- 2001 PORT
- 2002 DRIVER

2006 PORT NAME: [                    ]

2008 ADD
2007 UPDATE

2005 REGISTERED PORTS 160.40.38.4

177.51.20.33

FAX

NS_FAX

2009 DELETE

2003 OK
2004 CANCEL

JOB INFORMATION MANAGEMENT METHOD AND APPARATUS

FIELD OF THE INVENTION

The present invention relates to a job information management technique.

BACKGROUND OF THE INVENTION

A job management method for an information processing system which acquires and manages job information has conventionally been developed (see, e.g., Japanese Patent Laid-Open No. 2002-116899). Pieces of job information executed by a peripheral device are collected.

In conventional job information collection, whether to collect pieces of job information is not determined on the basis of the job information generation process. For this reason, pieces of unnecessary or abnormal job information may be collected. For example, the output destination is set to a predetermined memory area in a host computer or external file server. Display control data, image data, or printing data in a PDF file or the like is generated by an application or driver and output without any printing processing. Even in this case, pieces of job information may be recorded or accumulated.

The system may include an image forming apparatus which does not correspond to job information collection. In use of such image forming apparatus which does not support job information collection, abnormal job information may be created.

In this manner, when pieces of various job information are collected, desired job information cannot be managed at high precision.

SUMMARY OF THE INVENTION

The present invention realizes high-precision job information management.

An aspect of the present invention provides a mechanism of determining in accordance with the driver whether to record or accumulate job information, and recording or accumulating job information corresponding to the output destination of a job. Another aspect of the present invention provides a mechanism of determining in accordance with the output destination whether to record or accumulate job information, and accumulating or recording job information of a desired driver.

To achieve the above features, as a method according to the present invention, an information processing method of managing job information on a job issued from an information processing apparatus to an image forming apparatus is comprising: an acquisition step of acquiring the job information from the information processing apparatus or the image forming apparatus, a determination step of determining whether to record the job information acquired in the acquisition step, and a recording step of recording the job information determined in the determination step to be recorded.

As another method according to the present invention, an information processing method of recording or accumulating job information on a job issued from an information processing apparatus connectable to an image forming apparatus is comprising: an acquisition step of acquiring the job information from the information processing apparatus or the image forming apparatus, a determination step of determining whether to record or accumulate the job information acquired in the acquisition step, in accordance with an output destination of a job corresponding to the job information, and a recording/accumulation step of recording or accumulating the job information determined in the determination step to be recorded or accumulated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1A is a block diagram showing the configuration of a job account system as an example of an embodiment of the present invention;

FIG. 1B is a block diagram showing the configuration of the job account system as the example of the embodiment of the present invention;

FIG. 6 is a view showing an example of loading to the computer system the job account program and related data which are recorded on the FD, as still another example of the embodiment of the present invention;

FIG. 7 is a table showing an example of a hook log according to the embodiment of the present invention;

FIG. 8 is a table showing an example of a driver log according to the embodiment of the present invention;

FIG. 9 is a table showing an example of an API log according to the embodiment of the present invention;

FIG. 10 is a table showing an example of a monitor log according to the embodiment of the present invention;

FIG. 12 is a table showing an example of a merge log according to the embodiment of the present invention;

FIG. 13 is a table showing an example of a device log according to the embodiment of the present invention;

FIG. 14 is a table showing another example of the device log according to the embodiment of the present invention;

FIG. 17 is a table showing an example of the final log according to the embodiment of the present invention;

FIG. 20 is a view showing an example of a port name registration/delete dialog according to the embodiment of the present invention.

DETAILED DESCRIPTION OF THE PREFERRED EMBODIMENTS

Figure 2:
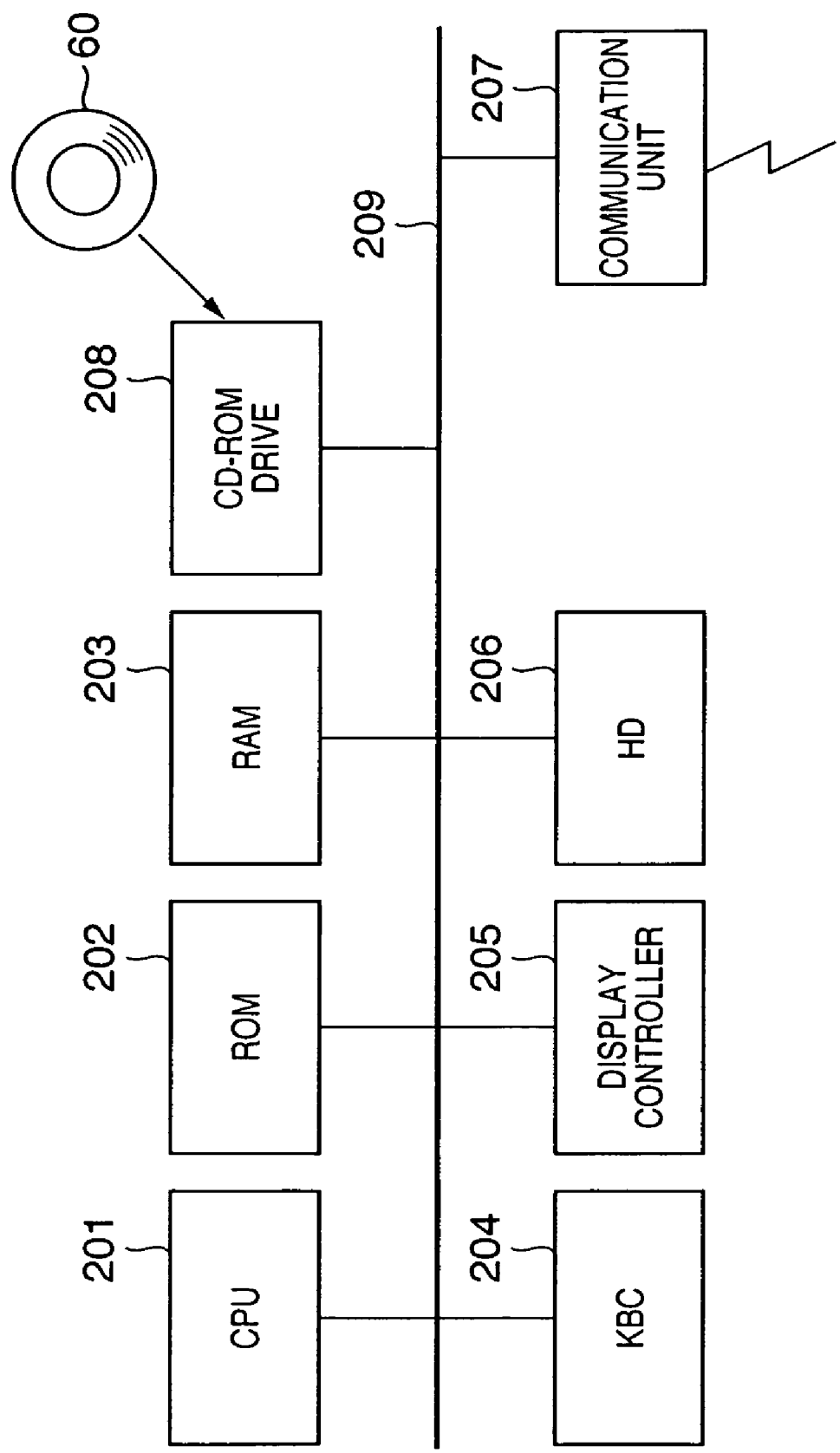
FIG. 2 is a block diagram showing an example of the configurations of a client computer and server computer which constitute the job account system shown in FIGS. 1A and 1B.

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

<System Configuration>

FIG. 1A is a block diagram showing an example of an information processing system as a preferred embodiment capable of practicing an information processing method according to the present invention.

The information processing system includes at least one first information processing apparatus, at least one second information processing apparatus, and at least one image forming apparatus. FIG. 1A illustrates client computers 1001 to 1003 as the first information processing apparatuses, a server computer 2000 as the second information processing apparatus, and as the image forming apparatuses, printers 108 to 110, a facsimile apparatus, copying apparatus, and an MFP (MultiFunction Printer) which has these multiple functions.

These apparatuses are connected by a local area network (to be simply referred to as a network) 3000 constructed by Ethernet® or the like, and can communicate with each other.

The client computers 1001 to 1003 are used by users. The server computer 2000 is a control computer which manages and remote-controls the client computer 1001, printer 110, and the like on the network 3000. The difference between the client computers 1001 to 1003 and the server computer 2000 is not a hardware one, but whether to execute a job account client program (to be referred to as a job account client hereinafter) or whether to execute a job account server program (to be referred to as a job account server hereinafter).

As will be apparent from the following description, the server computer 2000 is managed by the administrator, and the users of the client computers 1001 to 1003 and the like need not recognize the presence of the server computer 2000.

FIG. 1A shows three client computers used by general users, but the number of client computers does not limit the present invention. Other computers may be connected to the network 3000, and may not be connected to a printer.

Although this system may include various types of image forming apparatuses, this embodiment will exemplify the printers 108 to 110.

The printer 108 has a function of printing data received from the client computers 1001 to 1003, but does not have any function of outputting job information of the printer 108 to an external device.

In addition to the function of the printer 108, the printer 109 has a function of notifying the client computers 1001 to 1003 of printing results such as the total number of delivery pages of a job at the end of the job.

The printer 110 has a function of storing job information in the printer memory after printing and outputting the job information in accordance with a request from the server computer 2000.

The server computer 2000 records the job log of a client computer via the network 3000, and selects a specific job log in accordance with a request from a user who wants to browse it. Further, the server computer 2000 performs accumulation processing for unit period, each device, each job-issuing user, or the like.

In this embodiment, TCP/IP is used as the protocol of the network 3000, but any protocol can be adopted as far as the following functions are realized.

<Software Configuration of System>

FIG. 1B is a block diagram showing the software configuration of the information processing system.

Each of the client computers 1001 to 1003 includes an application 102, hook module 103, GDI 104 (subsystem which processes graphic drawing), printer driver 105, spooler 106, transmission/reception module 107, and job account client 118.

Of these components, the application 102 includes an image processing application which receives and processes image data, and a wordprocessor application which creates document data. The application 102 runs on an operating system (not shown). The GDI 104 and transmission/reception module 107 are modules included in the operating system. The printer driver 105 is a program prepared by the printer manufacturer in accordance with the printer controlled by each of the client computers 1001 to 1003. The printer driver 105 interfaces the application 102 and printers such as the printers 108 to 110. The spooler 106 is a temporary memory area ensured by the printer driver 105.

The server computer 2000 includes a job account server 121. The job account server 121 includes a job log merge module 123, job log storage module 124, job log reception module 122, job log accumulation module 125, ID generation module 126, and non-processing target database 129.

Operations in the client computers 1001 to 1003 and server computer 2000 will be explained.

In the client computers 1001 to 1003, when a printing command is issued to the application 102, the application 102 makes a GDI call for drawing.

The hook module 103 is installed together with the job account client 118. The hook module 103 hooks (monitors and recognizes) a GDI call, and accumulates pieces of information on the correspondence between a GDI call and a parameter and the number of calls. For example, the hook module 103 counts page breaks or delivery APIs (Application Programming Interfaces) to acquire the number of delivery sheets or pages of a job issued from the application 102. The hook module 103 transfers a log created on the basis of the information as a hook log 111 to the job account client 118. The hook module 103 can also change a document name on the basis of a predetermined determination criterion. A document name and change processing will be described later.

FIG. 7 is a table showing an example of the hook log 111. The hook log can provide a job ID, an application name, the number of logical pages, and a document name. The job ID can be acquired from the GDI when the GDI is instructed to start printing, and can uniquely designate the printing jobs of the client computers 1001 to 1003.

Referring back to FIG. 1B, the printer driver 105 converts the GDI call into printing data interpretable by the printer in accordance with printing settings, and transfers the printing data to the spooler 106. The printer driver 105 extracts printing information from the converted contents, and transfers the extracted information as a driver log 112 to the job account client 118.

FIG. 8 is a table showing an example of the driver log 112. The driver log 112 is log information which can be acquired by the job account client from the driver in execution of printing. As the driver log 112, a job ID serving as the identifier of a job concerning execution of printing, the paper size of printing data contained in the job, N-up information, information on the number of physical pages, and double-/single-sided printing information can be acquired. The paper size, N-up information, the number of physical pages, and double-/single-sided printing information are acquired from printing settings which are set by the printer driver in printing or default input. N-up information is a setting which designates the number of logical pages imposed on a paper sheet. The number of physical pages is obtained by counting one side of a paper sheet output in printing as one.

For example, 2-up printing processing of four logical pages by double-sided printing results in two physical pages. The physical pages are printed on the upper and lower surfaces of a paper sheet, and one paper sheet is delivered. The first and second logical pages are printed on the upper surface, whereas the third and fourth logical pages are printed on the lower surface.

Referring back to FIG. 1B, the job account client 118 periodically monitors the spooler. If a spooled job exists, the job information is acquired by an API, thus acquiring the number of delivery sheets or pages of the job. The acquired job information is transferred as an API log 113 to the job account client 118.

FIG. 9 is a table showing an example of the API log 113. As the API log 113, a job ID, the owner name of a job, and a spool data size can be acquired.

The transmission/reception module 107 communicates with any printer such as one of the printers 108 to 110 that is designated by the application. If the printer is ready, the transmission/reception module 107 transmits printing data. At this time, if, for example, a PrinterJobLanguage (printer job language) command available from HP is used, the number of pages delivered by a printing job can be acquired after delivery of all pages of the job is completed in the printer 109. The transmission/reception module (port monitor) 107 transmits to the job account client 118 job information such as the number of pages received from the printer 109. A printing log created on the basis of this information will be called a monitor log 114.

FIG. 10 is a table showing an example of the monitor log 114. As the monitor log 114, a job ID can be acquired. When the monitor log 114 is transmitted to the printer 108, the numbers of delivery pages and sheets can be additionally acquired.

The hook log 111, driver log 112, API log 113, and monitor log 114 ensure an area for storing flag information representing whether the job has been processed and information representing the type of log.

The job account client 118 serving as a software module which is executed in the CPU of the client computer includes a job log merge module 116 and job log transmission module 117 in order to collect logs concerning various printing processes and transmit the logs to the job account server 121.

The job log merge module 116 in FIG. 1B merges the hook log 111, driver log 112, API log 113, and monitor log 114. In general, every time merge processing ends, the job log merge module 116 transmits a merge log 127 to the job log transmission module 117. FIG. 12 is a table showing an example of the merge log 127 when the logs shown in FIGS. 7 to 10 are merged. As shown in FIG. 12, the merge log 127 has the items of the hook log 111, driver log 112, API log 113, and monitor log 114.

The job log transmission module 117 transmits the log to the job log reception module 122 periodically or in accordance with a request from the job log reception module 122. At this time, the job log transmission module 117 may control the transmission/reception module 107 provided by the OS and transmit the log to the job log reception module 122. The job account client 118 can set a priority order of selecting which of the hook log 111, driver log 112, API log 113, and monitor log 114, and transmit any log to the job account server 121.

The operation of the job account server 121 will be explained.

The job log reception module 122 acquires and accumulates a job sent from the job log transmission module 117. When a network printer such as the printer 110 which internally stores job information exists on the network, the job log reception module 122 can acquire job information as an device log 115 directly from the printer by defining a protocol to the printer and communicating with the printer. More specifically, the printer 110 is periodically polled, and if unacquired job information exists, the job information is acquired as the device log 115. The device log 115 is stored in the RAM or HD of the printer 110, but it is not desirable to store all pieces of information such as a document name transmitted from the transmission/reception module 107 to the printer owing to limitations on the memory capacity. FIG. 13 is a table showing an example of the device log 115 when a job is transmitted to the printer 110 from a client computer in which the hook module 103 runs. FIG. 14 is a table showing another example of the device log 115 when a job is transmitted to the printer 110 from a client computer in which no hook module 103 runs.

The job log merge module 123 merges the device log 115 and the merge log 127 which is sent from the job account client, generating a final log 128. FIG. 17 is a table showing an example of the final log 128 when the merge log 127 shown in FIG. 12 and the device log 115 shown in FIG. 13 are merged.

The job log storage module 124 receives the final log 128 from the job log merge module 123, looks up the non-processing target database 129, and if the final log 128 is not a non-processing log, stores the final log 128 in an HD 206 or the like. The job log accumulation module 125 performs accumulation processing of obtaining the number of printing pages per unit period, or obtaining the number of printing pages for each owner in accordance with an instruction from the user. The job account server 121 controls processing of displaying the accumulation result on a CRT serving as the display of the server computer 2000.

The ID generation module 126 generates an ID for uniquely identifying the client computers 1001 to 1003. The ID generation module 126 changes a character string of four digits which can take 26 values from a to z at each digit, sequentially from aaaa, aaab, . . . , zzzy, zzzz in accordance with a request from the hook module 103, and issues the character string so as to uniquely identify the client. In this case, a new document name is created using a combination of a host and job ID. Alternatively, a unique new document name (to be described later) in the whole printing system may be issued in the job account server in a unified way.

In the client computers 1001 to 1003, four logs, i.e., the hook log 111, driver log 112, API log 113, and monitor log 114 are created for one printing job. However, the four logs cannot always be acquired. For example, if the application 102 directly sends printing data to the spooler 106, the hook log 111 and driver log 112 cannot be acquired. If no protocol is defined between the printer driver 105 and the job account client 118, the driver log 112 cannot be acquired. In the absence of a function of notifying the transmission/reception module 107 of the number of delivery pages, unlike the printer 108, delivery page information of the monitor log 114 cannot be acquired. However, even if log acquisition is impossible in some processes, the possibility of acquiring logs increases by acquiring logs in a plurality of processes concerning the job.

In this information processing system, whether to record or accumulate logs serving as pieces of job information acquired from the client computers 1001 to 1003, printer 110, and the like is determined on the basis of the log generation process (port information and driver information). Only a log determined to be recorded is recorded in the server computer 2000. Alternatively, the job account server 121 having the accumulation function in the server computer 2000 may record all pieces of acquired job information. After that, an accumulation target job which is corrected as a charging target or as a sheet counting job may be determined from all pieces of recorded information. The job account server 121 may extract job information determined to be accumulated from the job information database. Determination processing can employ all criteria for determining whether to record job information.

<Hardware Configuration of Each Computer>

FIG. 2 is a block diagram showing an example of the hardware configuration of any one of the client computers 1001 to 1003 and server computer 2000. As described above, the client computers 1001 to 1003 and server computer 2000 are not different in the basic hardware configuration, and all the computers have the following configuration.

In FIG. 2, reference numeral 201 denotes a CPU (Central Processing Unit) which performs control of the overall computer, arithmetic processing, and the like. Reference numeral 202 denotes a ROM (Read Only Memory) serving as a memory area for system startup program information and the like. Reference numeral 203 denotes a RAM (Random Access Memory) serving as a data memory area without any use limitation. Reference numeral 204 denotes a KBC (Key-Board Controller) which receives input data from a keyboard and transmits it to the CPU 201. Reference numeral 205 denotes a display controller which controls display on a CRT or liquid crystal display. Reference numeral 206 denotes an HD (Hard Disk). The HD 206 stores a program and data, and if necessary in execution, looks them up or loads them to the RAM 203. Reference numeral 207 denotes a communication unit used to communicate with another computer or peripheral device connected to the network. The communication unit 207 is controlled by the transmission/reception module 107 in FIG. 1, job log transmission module 117, or the like. Reference numeral 209 denotes a system bus serving as a data path between these hardware components.

An operating system, a communication control program, and software modules such as the application 102, hook module 103, GDI 104, printer driver 105, transmission/reception module 107, and job account client 118, shown in FIG. 1B are loaded from the HD 206 or ROM 202 to the RAM 203, and executed by the CPU 201.

Another memory device may be adopted instead of or in addition to the HD 206 shown in FIG. 2. An example of such memory device is a nonvolatile memory.

<Hardware Configuration of Each Printer>

Figure 3:
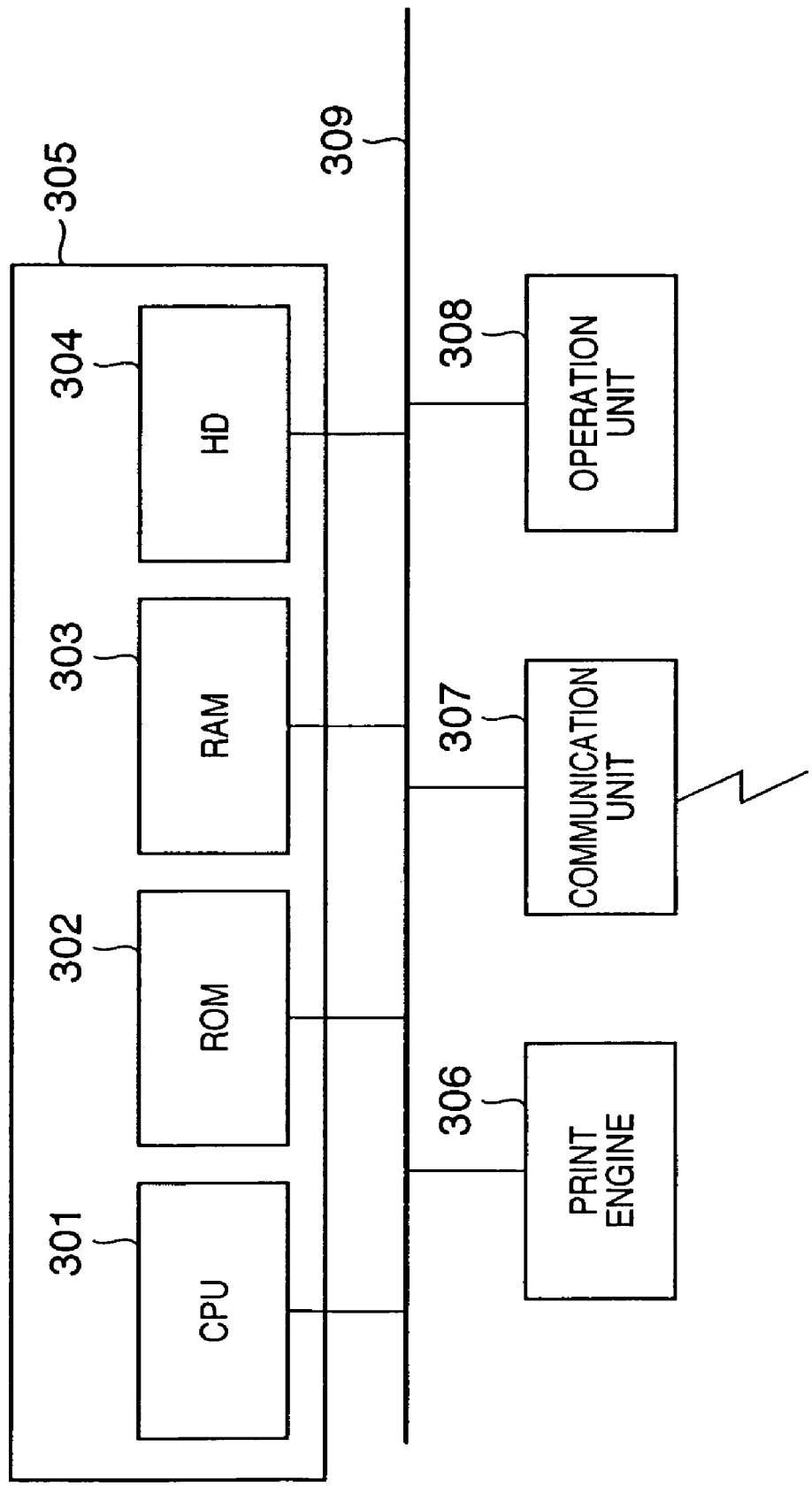
FIG. 3 is a block diagram showing an example of the configuration of a printer which constitutes the job account system shown in FIGS. 1A and 1B.

FIG. 3 is a block diagram showing an example of the configuration of the printers 108 to 110 which constitute the information processing system. In FIG. 3, reference numeral 305 denotes a controller which controls the whole printer. The controller 305 incorporates a CPU 301, ROM 302, RAM 303, and HD 304.

The CPU 301 is a central processing unit which performs control of the whole printer, arithmetic processing, and the like. The ROM 302 is a read-only memory which includes a memory area for system startup program information and the like. The RAM 303 is a random access memory which includes a data memory area without any use limitation. The HD 304 is a hard disk which includes a memory area that ensures a program or data that may be rewritten even after the printer is powered off.

The RAM 303 has a memory-area in which an operating system or a program for communication control or engine control is loaded and executed. A print engine 306 performs printing operation and image read operation under the control of the controller. A communication unit 307 communicates with the client computer or server computer via the network. An operation unit 308 is used to perform interactive setting operation with the user. A system bus 309 serves as a data path between these building components.

<RAM Structure and Implementation Method of Server Computer>

Figure 4:
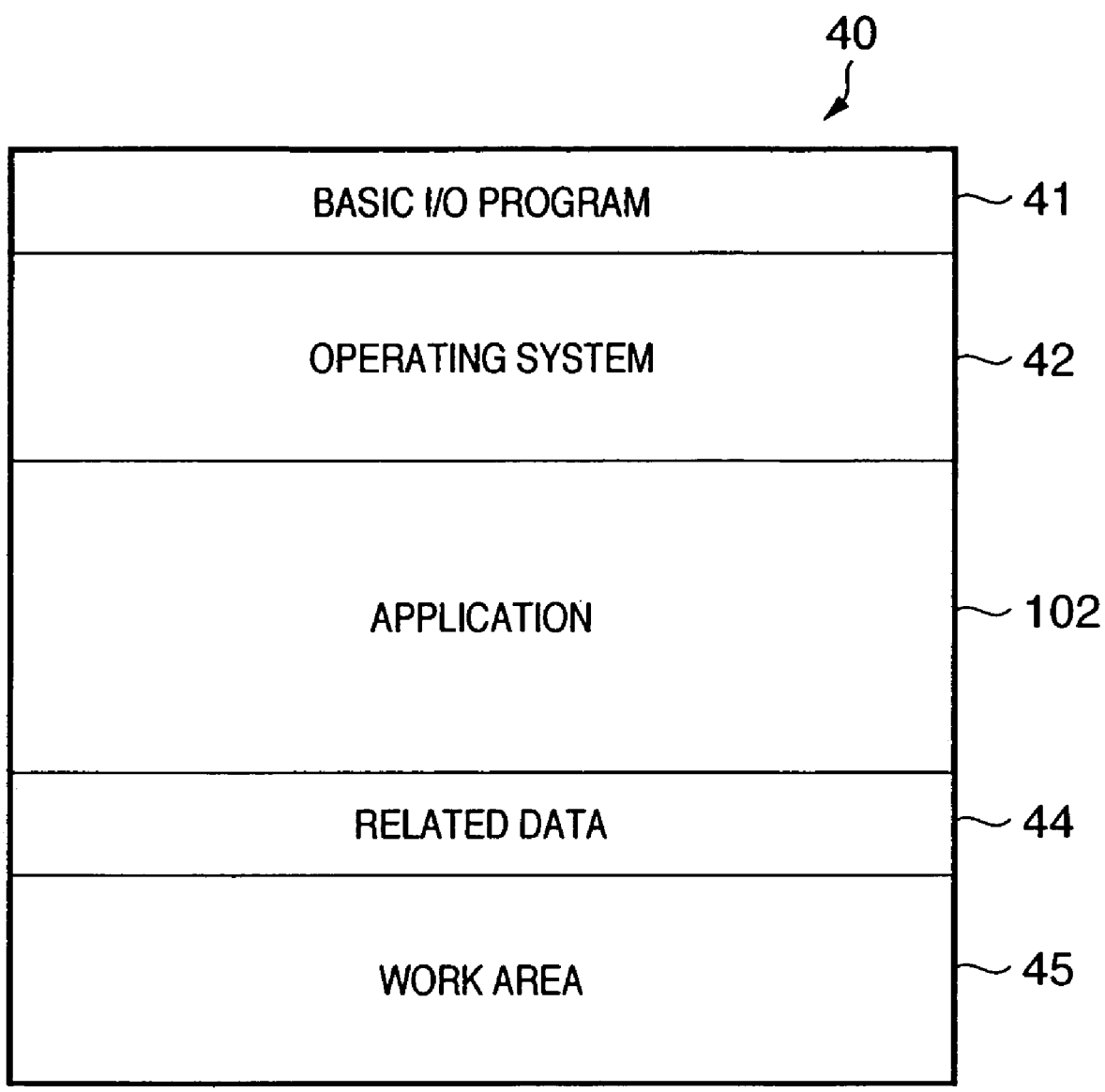
FIG. 4 is a view showing an example of the memory map of the job account system shown in FIGS. 1A and 1B.

FIG. 4 is a view showing a memory map 40 in the RAM 203 of a client computer 1000.

In the server computer 2000, a basic I/O program 41, an operating system 42, and the application 102 are loaded to the RAM 203 so as to be able to execute them, as shown in FIG. 4. In addition to these programs, the RAM 203 of the server computer 2000 stores related data 44 generated as a result of execution by the application 102. Further, a work area 45 used by another program is prepared.

The software configuration of the server computer 2000 as shown in FIG. 1B can be realized by externally installing the job account server 121. As an installation method, the job account server 121 can be downloaded via a network such as the Internet, or installed from a portable detachable storage medium.

Figure 5:
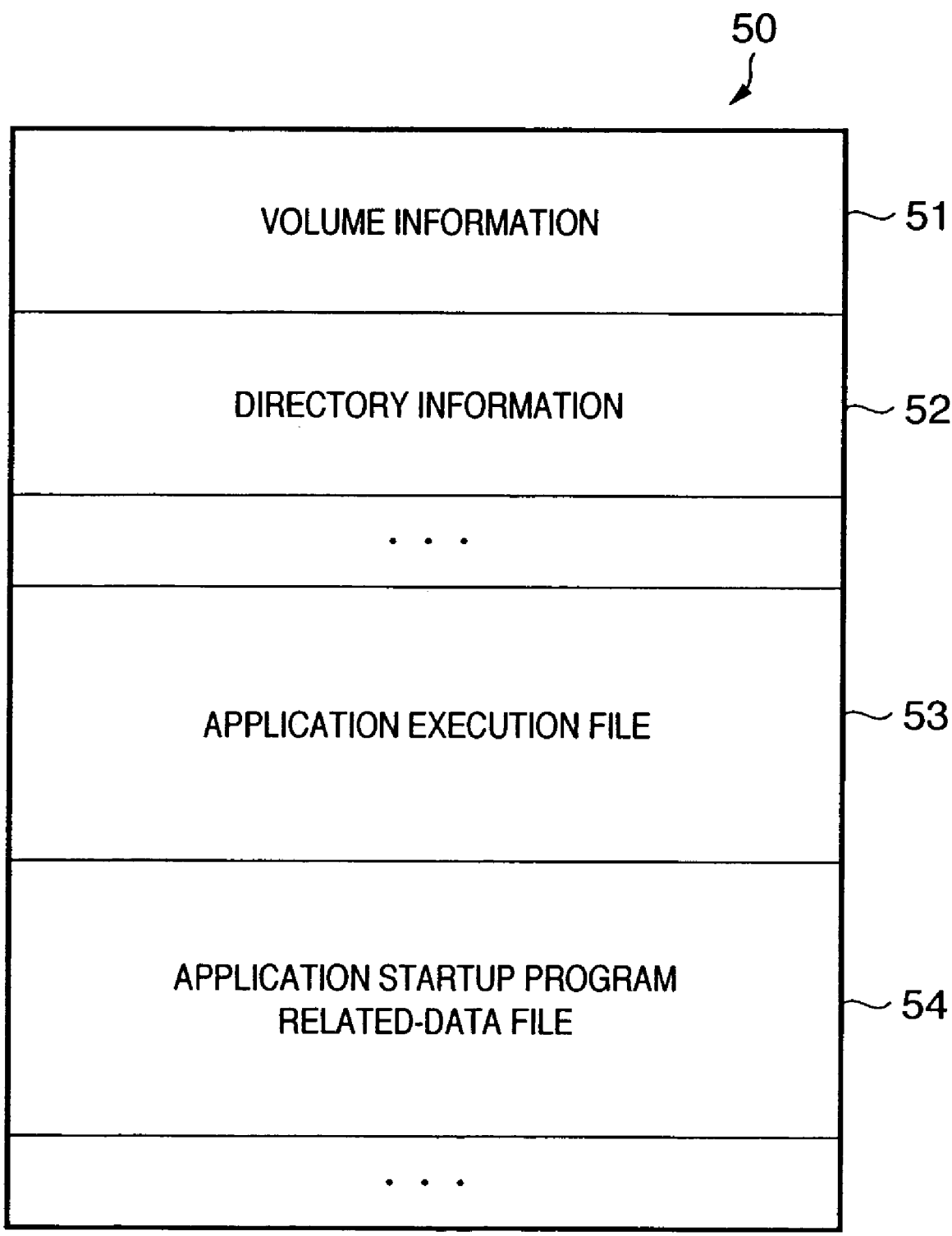
FIG. 5 is a view showing the contents of an FD which stores a job account program and related data, as another example of the embodiment of the present invention.

For example, as shown in FIG. 6, a CD-ROM 60 is loaded to a CD-ROM drive 208 of the server computer 2000. In this case, as shown in FIG. 5, volume information 51, directory information 52, an execution file 53, and a related-data file 54 are recorded in a memory area 50 of the CD-ROM 60.

The execution file 53 includes the installation program of the job account server 121.

When the CD-ROM 60 is set in the CD-ROM drive 208, the execution file 53 is executed under the control of the operating system 42 and basic I/O program 41. Related data such as a program module for realizing the job account server 121 is read out from the CD-ROM 60 and stored in the HD 206. The program module for realizing the job account server 121 includes the modules 122 to 126 shown in FIG. 1B.

The storage medium is not limited to a CD-ROM, and may be a DVD, FD, or the like.

<Operation of Hook Module>

Figure 15:
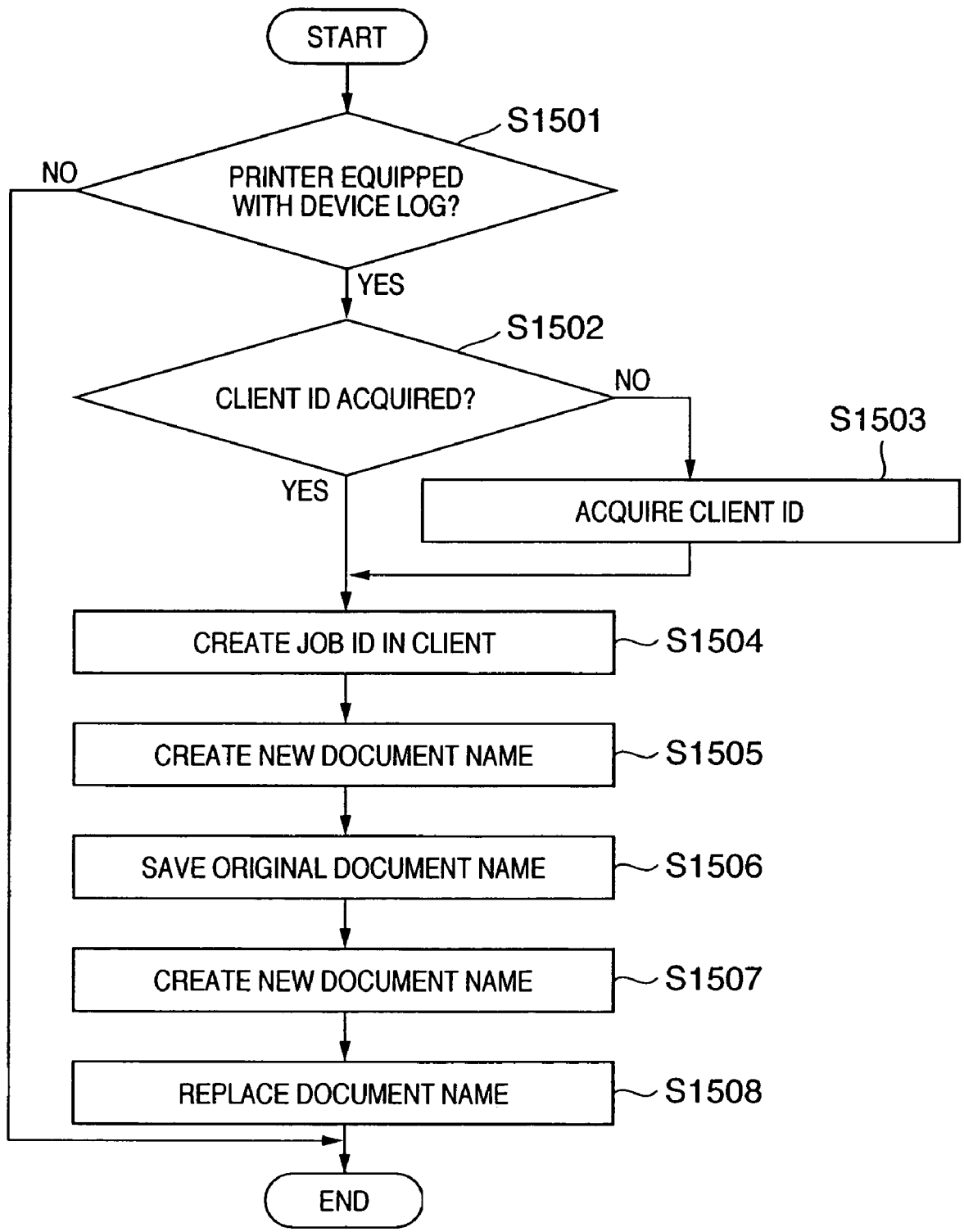
FIG. 15 is a flow chart showing an example of a sequence of changing a document name according to the embodiment of the present invention.

FIG. 15 is a flow chart showing processing performed by the hook module 103.

In step S1501, the hook module 103 acquires, by a predetermined device management protocol, information representing whether the destination printer comprises a device log, and determines whether the destination printer comprises a device log. If YES in step S1501, the processing advances to step S1502; if NO, the processing ends.

In step S1502, the hook module 103 determines whether the client ID has already been acquired. If YES in step S1502, the processing advances to step S1504; if NO, to step S1503. The client ID is identification information which is issued from the ID generation module 126 and can uniquely identify the client computers 1001 to 1003. In step S1503, the hook module 103 communicates with the ID generation module 126, and acquires from the ID generation module 126 an ID for uniquely identifying a client computer.

In step S1504, the hook module 103 creates a client job ID for uniquely specifying a job in a client computer. At this time, numerical values from 0001 to 9999 are sequentially issued.

In step S1505, the hook module 103 merges the client ID which is determined in step S1503 to have been acquired and the client job ID created in step S1504, thereby creating a new document name as an example of new identification information which is uniquely determined in the printing system.

In step S1506, the hook module 103 stores an original document name transferred from the application in a hook log item "original document name". In step S1507, the hook module 103 replaces the document name with the new document name in step S1505. As a result, the new document name is transferred as a document name to the GDI. Processes in the printer driver 105, spooler 106, transmission/reception module 107, and printer 110 subsequent to GDI processing are preferably executed using the new document name as the document name.

The new document name is created because it is difficult to directly use the job ID as a merge processing key in merging job information acquired from a printing apparatus. For example, some of specifications of the job management system are not disclosed. When account server A developed by company A is used, the account server developed by company A cannot acquire any job ID from a printer developed by company B in many cases. That is, even if job information is acquired from a printer corresponding to an unassumed job management system, the job information does not contain a job ID in many cases, and cannot be merged and utilized. However, a document name which is created by the OS or application of a client computer and transmitted to a printer can be often acquired as job information.

For this reason, a document name which can be managed by a client and acquired as a job information key from a printer instead of the job ID may be managed as identification information. However, direct use of a conventional document name poses a problem. The OS or application of a client can generally manage a document name of more than eight characters, and a document name of up to 255 characters can be assigned in a generally used OS. The printer can manage up to eight characters, as described above. In general, the document name which can be adopted in the job management system can be formed by up to eight characters. When the client assigns a document name of more than eight characters, jobs having the same document name may confusedly coexist in the printer though their document names assigned by the OS or application of the client are different. To prevent this, a host ID is issued from the account server, and used in combination with a document name issued from the client.

As a result, a new document name which is managed within eight characters by the account server and uniquely determined in the printing system including the client computer and printer is completed. The new document name can be used to identify a job, in place of the job ID. Once a new document name is generated on the client side, the document name can be utilized as a job identifier in the printer, client, and account server.

<Operation of Job Log Merge Module in Client>

Figure 11:
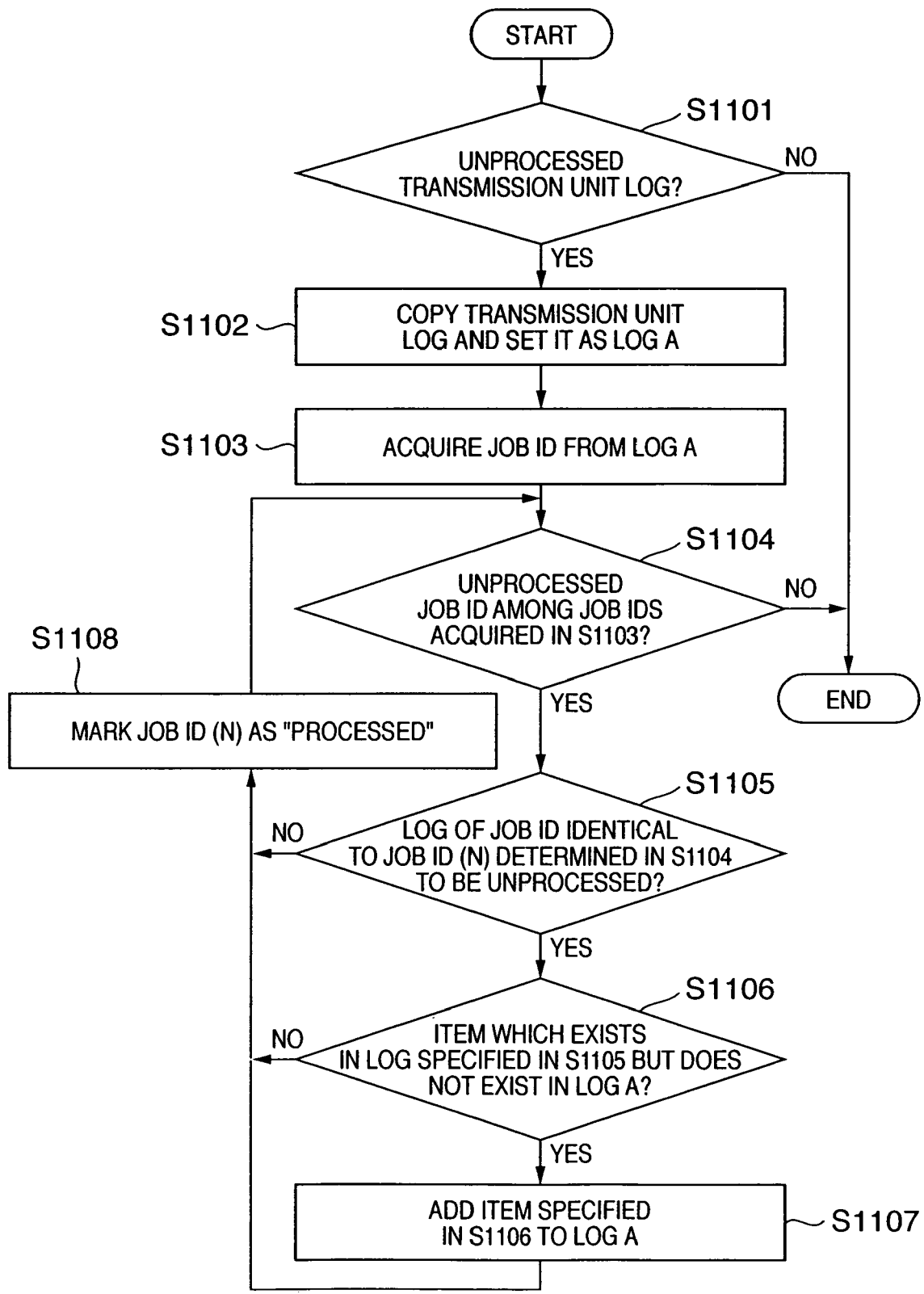
FIG. 11 is a flow chart showing an example of a sequence of merging logs according to the embodiment of the present invention.

FIG. 11 is a flow chart showing processing of merging logs by the job log merge module 116.

The job log merge module 116 receives logs such as the hook log 111, driver log 112, API log 113, and monitor log 114, and records the contents on the HD 206 or the like. The job log merge module 116 periodically executes the following processing in a preset period, and performs merge processing for each job. In this embodiment, logs are merged (merge processing) using a job ID as a key. Logs may be merged using a document data name or new document data name (to be described later).

In the following processing, the job log merge module 116 specifies the earliest start time and latest completion time among start times represented by entries of pieces of start time information and completion time information which are contained in the hook log, driver log, API log, and monitor log. Each time information is stored as job information merged by merge processing, as described above.

In step S1101, the job log merge module 116 searches for and specifies a monitor log (see FIG. 10) whose "processed" flag has not been set to YES, i.e., an unprocessed monitor log. If an unprocessed monitor log exists, the processing advances to step S1102.

In step S1102, the job log merge module 116 copies in another temporary memory area the monitor log which is determined in step S1101 to have not been processed, and sets this log as log A.

In step S1103, the job log merge module 116 acquires a job ID from log A. In step S1104, the job log merge module 116 determines whether a log not subjected to merge processing yet, i.e., an unprocessed log exists in logs corresponding to the job ID acquired in step S1103, by searching for and specifying the logs of the hook log, driver log, and API log on the basis of the job ID. If NO in step S1104, the processing ends; if YES, the job log merge module 116 advances to step S1105 to determine the presence of a log having the same job ID as the job ID (in this case, N for descriptive convenience) which is determined in step S1104 to have not been processed, by searching the logs of the hook log 111, driver log 112, and API log 113 to specify the target log on the basis of the job ID. The job log merge module 116 then sets this log as log B.

If a log having the same job ID as N does not exist in the logs of the hook log 111, driver log 112, and API log 113 in step S1105, the processing advances to step S1108. If a log having the same job ID as N exists in any log in step S1105, the processing advances to step S1106. In step S1105, for example, N is set by specifying job IDs contained in unprocessed log A sequentially from a smaller ID.

In step S1106, the job log merge module 116 determines whether any of items in log B does not exist in log A, for each item (job information contained in each log acquired for the job ID "N") of the log which is specified in step S1105 and corresponds to the job ID "N" of log A. As for the items of the job ID "N" in log A, if log A is determined in step S1106 to have all the items in log B, the job log merge module 116 performs processing in step S1108. If log A is determined in step S1106 not to have a given item in log B, the job log merge module 116 advances to step S1107 to add the item of log B that does not exist in log A to the items of the job ID "N" in log A, and merge data stored in log A. The "processed" flag of the merge log 127 created by adding the item of log B to log A is set to "YES", and the processing advances to step S1108. After that, the type item of the merge log is set to "merge".

In step S1104 subsequent to S1108, if processing is determined to have been completed for all the job IDs of log A, the processing ends.

<Operation of Job Log Merge Module in Server>

Figure 16:
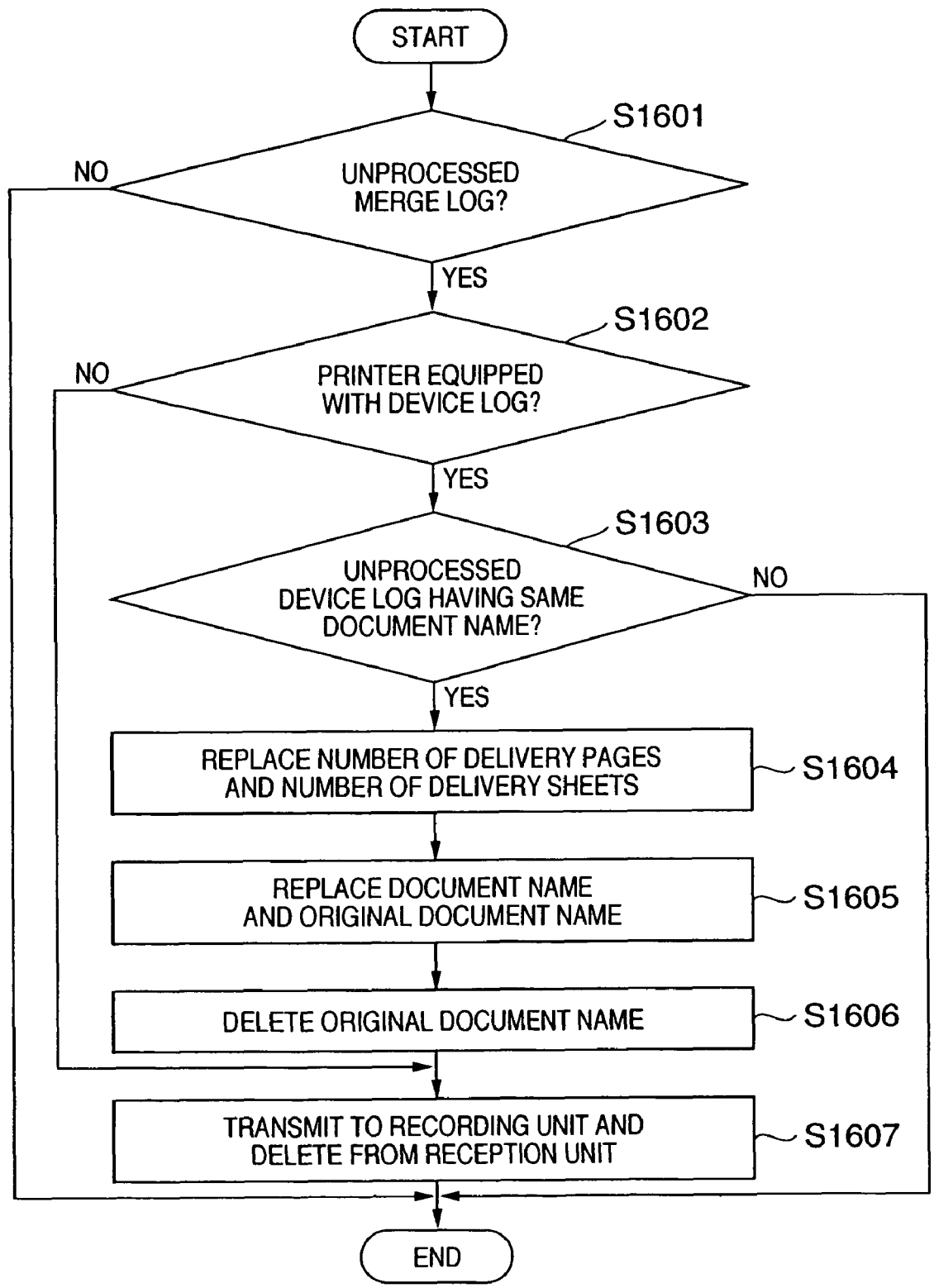
FIG. 16 is a flow chart showing an example of a sequence of merging logs to create a final log according to the embodiment of the present invention.

FIG. 16 is a flow chart showing processing of merging logs by the job log merge module 123 to create the final log 128.

In step S1601, the job log merge module 123 searches for an unprocessed merge log. If YES in step S1601, the processing advances to step S1602; if NO, the processing ends.

In step S1602, the job log merge module 123 determines whether the printer has a device log. If YES in step S1602, the processing advances to step S1603; if NO, to step S1607.

In step S1603, the job log merge module 123 searches for and determines an unprocessed device log whose document name item is the same as that of the merge log in step S1601. If YES in step S1603, the processing advances to step S1604; if NO, the processing ends. In step S1604, the job log merge module 123 replaces or adds the numbers of delivery pages and sheets of the device log with or to the merge log.

In step S1605, the job log merge module 123 replaces a document name and original document name. In the example of FIG. 13, "document name: 2001 annual report, original document name: abcd0001".

In step S1606, the job log merge module 123 deletes the original document name of the merge log 127 to create the final log 128. In step S1607, the job log merge module 123 transfers the final log 128 to the job log storage module 124.

<Operation of Job Log Storage Module>

Figure 18:
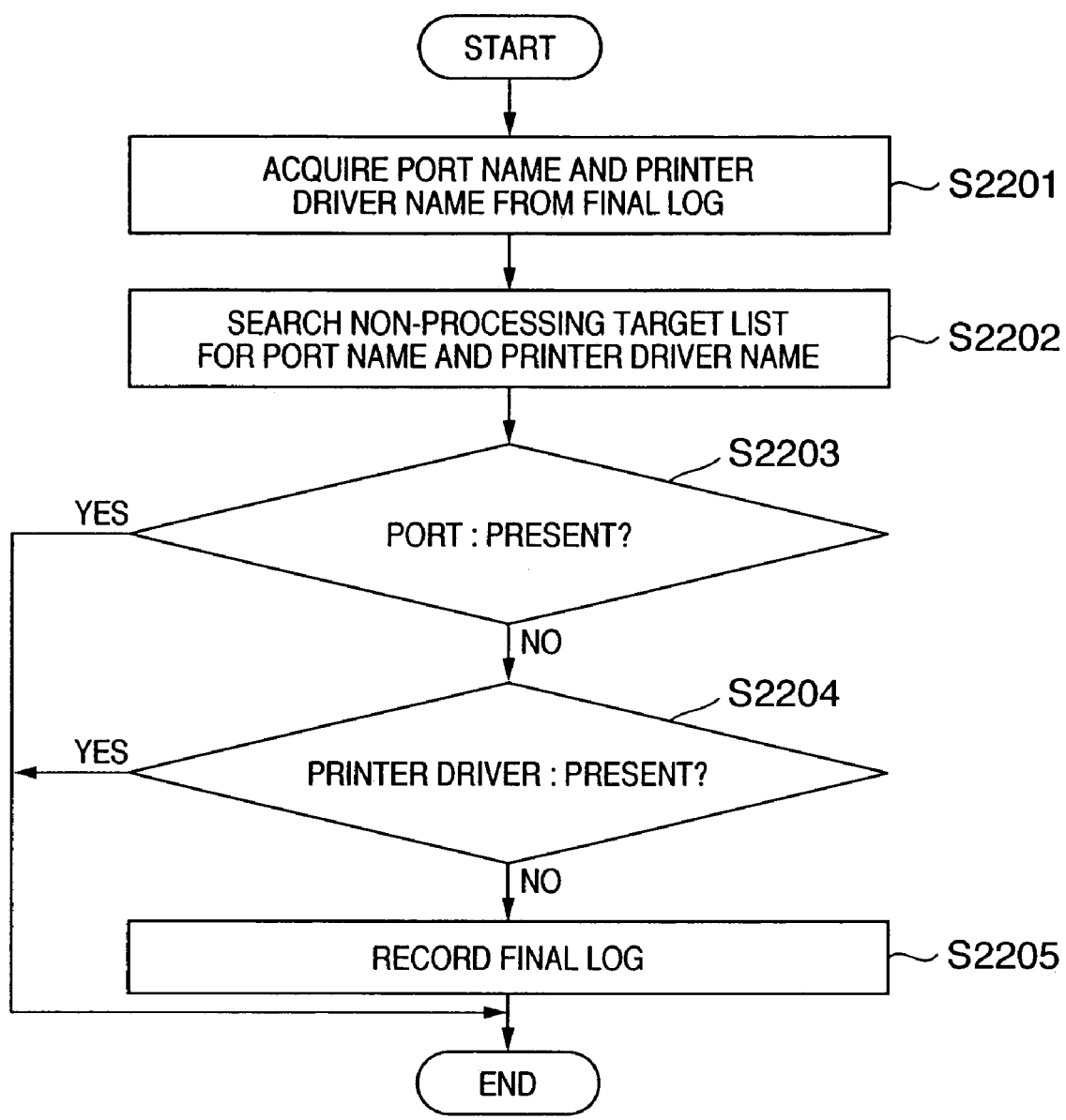
FIG. 18 is a flow chart showing processing of transmitting only proper log information to a server by using a non-processing port name and printer driver name according to the embodiment of the present invention.

FIG. 18 is a flow chart for explaining processing performed by the job log storage module 124.

In step S2201, the job log storage module 124 acquires a port name and printer driver name from the final log 128 (see FIG. 17) which is merged by the job log merge module 123. In step S2202, the job log storage module 124 looks up the non-processing target database, and determines whether the non-processing target database contains the port name and printer driver name acquired in step S2201. In condition determinations of steps S2203 and S2204, if either the port name or printer driver name is contained in the non-processing target database, the job log storage module 124 does not record the final log 128. If NO in steps S2203 and S2204, the processing advances to step S125 to record the final log 128. The final log 128 is then subjected to accumulation by the job log accumulation module 125.

The port includes both logical and physical meanings. In many cases, the port is a connection point in a computer at which a device for exchanging data with the computer can be connected. For example, a parallel port (also called an LPT port in some OSs) or TCP/IP port is created to allow connecting a printer. Some OSs can generate, as a logical port, a set of a driver, the IP address of an output destination printer, and a utility program for exchanging printing data packets. In this embodiment, job information can be acquired for each output destination printer, and job information can also be acquired for each logically created port as an output destination port. In other words, whether to acquire job information can be set for each set of an output destination such as a printer and a control program capable of printing by the printer set as the output destination.

A port name containing, e.g., the IP address of the client computer 1001 is set for the job account server 121 as the output destination of a port whose job information is excluded from an accumulation or recording target. When information which is contained in job information and represents an output destination is, e.g., an IP address, e.g., port name (network identifier) in FIG. 12 assigned to a computer having no printing apparatus, the job account server 121 is controlled not to record or accumulate job information. The computer name of the client computer 1001 can also be designated as a determination criterion for excluding job information from an accumulation or recording target. To the contrary, when the output destination is a peripheral device such as a printer having a printing function, job information can be recorded or accumulated unless the peripheral device is set as the output destination of a port whose job information is excluded from an accumulation or recording target. In this manner, the job account server 121 can achieve high-precision management such that counting or charging of paper sheets is done for a job actually output to a printer or the like, and counting or charging of paper sheets as an example of accumulation is not done for a job which is not actually output.

If a final log is created using a port or printer driver not subjected to accumulation, the final log is not accumulated.

<Registration/Delete Processing of Non-Processing Port/Driver>

Figure 19:
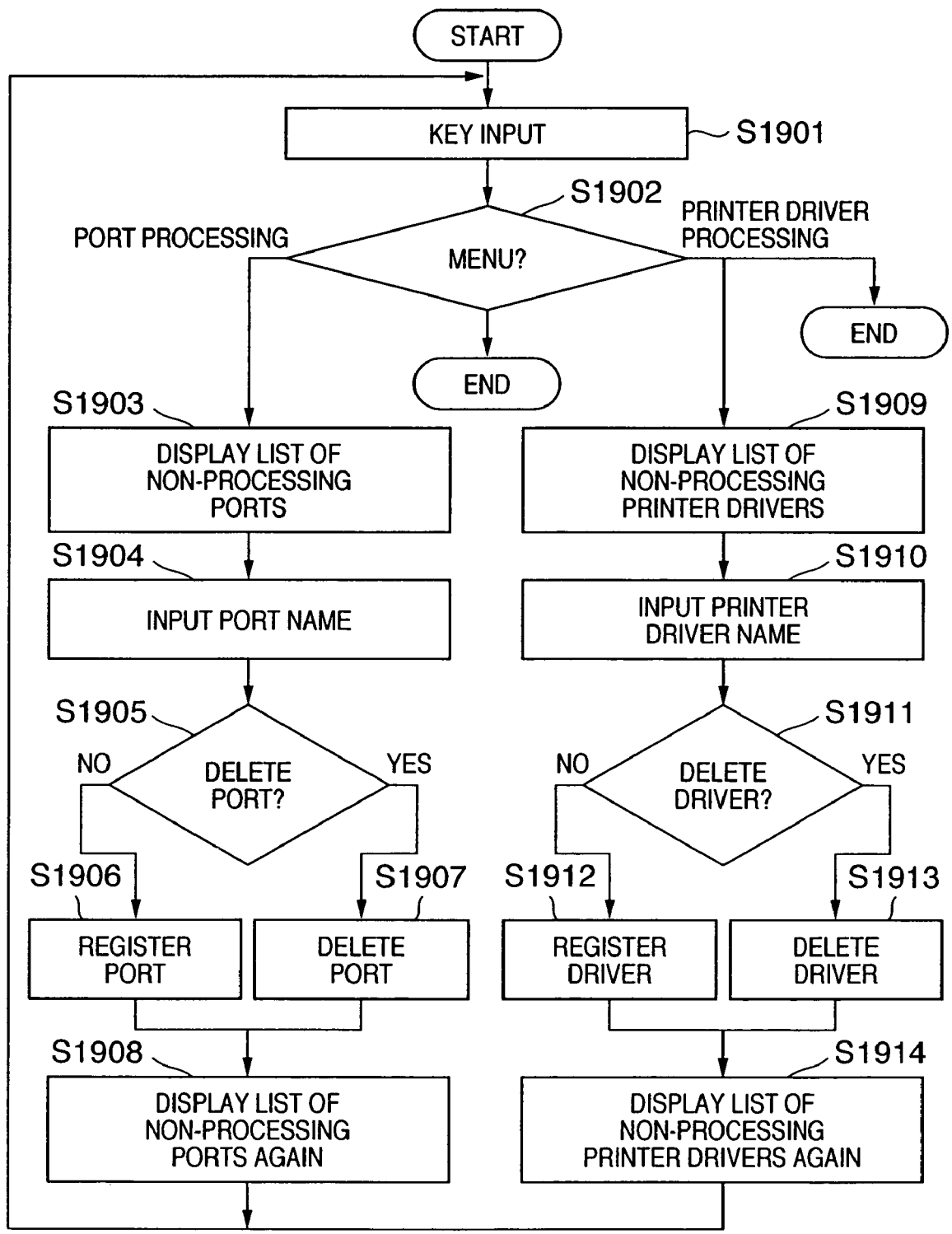
FIG. 19 is a flow chart showing an example of registration/delete processing of a port name or printer driver name according to the embodiment of the present invention.

FIG. 19 is a flow chart showing registration/delete processing of a printing port or printer driver in/from the non-processing target database 129. Processing shown in this flow chart is executed by the server computer 2000.

Figure 21:
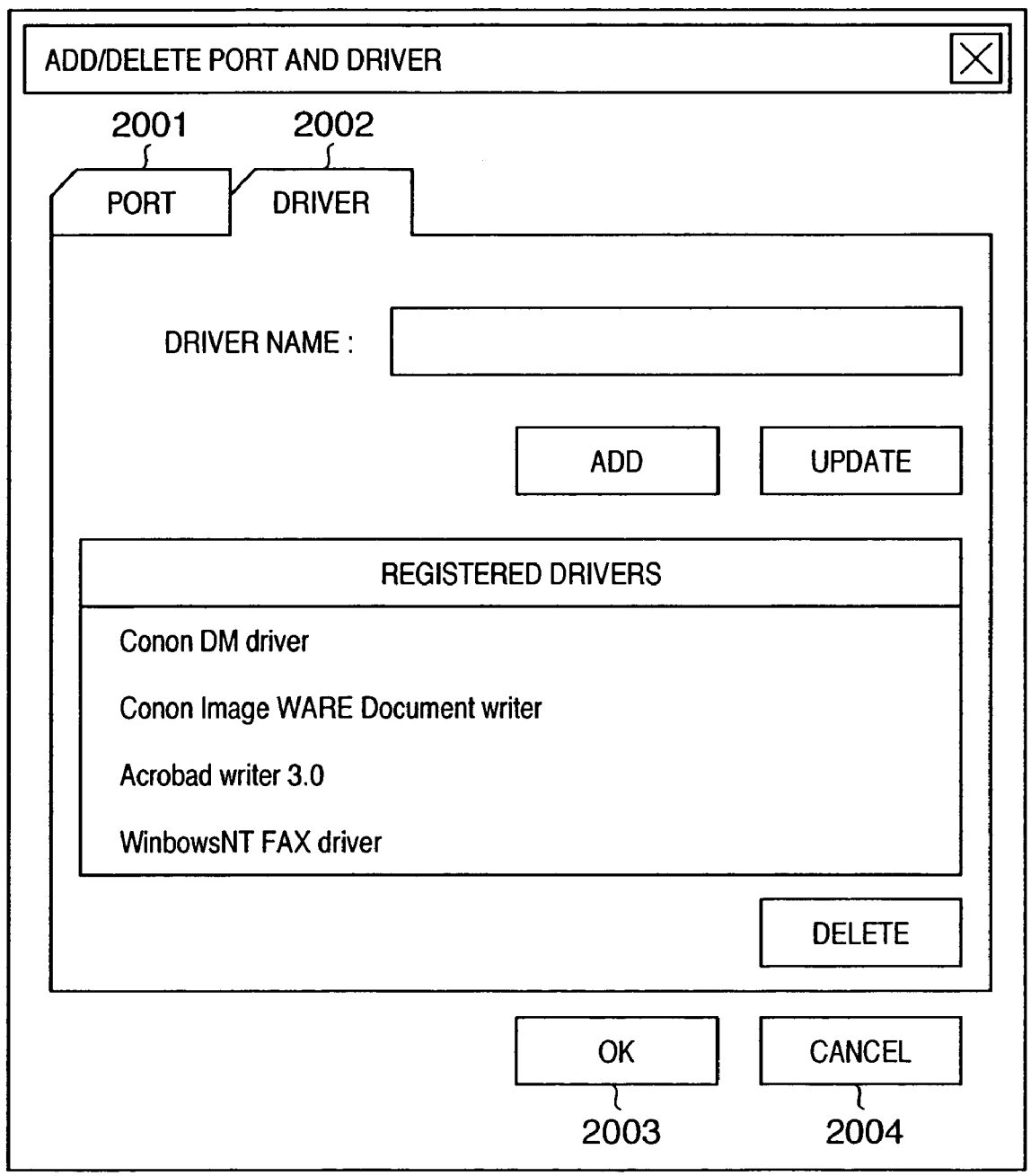
FIG. 21 is a view showing an example of a printer driver name registration/delete dialog according to the embodiment of the present invention.

FIGS. 20 and 21 show examples of dialogs for registering/deleting a printing port and printer driver in/from the non-processing target database 129. These dialogs are displayed on the display device (not shown) of the server computer 2000, and set with a keyboard or pointing device (not shown).

In step S1901 of FIG. 19, a key input on the processing menu from the user is accepted. In step S1902, which of port registration/delete processing, printer driver registration/delete processing, and end processing has been selected is determined.

In the dialogs shown in FIGS. 20 and 21, which of a port tab 2001, driver tab 2002, OK button 2003, and cancel button 2004 has been selected is determined. If the port tab 2001 has been selected, the processing advances to step S1903 to display a list of non-processing ports, as shown in FIG. 20. If the driver tab 2002 has been selected, a list of non-processing drivers is displayed in step S1909, as shown in FIG. 21. The entities of port names and driver names are registered in the registry.

In FIG. 20, port names such as "160.40.38.4", "177.51.20.33", "FAX", and "NS_FAX" are displayed in a registration port column 2005. In this state, if a port name is input in a port name input column 2006 in step S1904, the processing advances to step S1905. As a port name input method, a port name is directly input in the input column 2006, and an update button 2007 is selected. Alternatively, an add button 2008 is clicked to separately display a list of available port names, and a non-processing port name is selected from the list. In step S1905, whether to update, add, or delete a port is determined. If the add button 2008 or update button 2007 has been clicked, the processing advances to step S1906 to add or update a non-processing port name to the registry. If any port name has been selected from the registration port column 2005 and then a delete button 2009 has been clicked, the processing advances to step S1907 to delete the selected port name from the registry. In step S1908, the changed registration port column 2005 is displayed again. Also in the state shown in FIG. 21, a non-processing printer driver name is similarly added, updated, or deleted by a series of processes in steps S1909 to S1914.

If the OK button 2003 is selected in FIG. 20 or 21, a registered/deleted port or driver becomes valid. If the cancel button 2004 is selected, registration/delete processing becomes invalid, and the processing ends.

By this processing, a port name "IP_10.166.30.2" and a printer driver name "Acrobad writer 3.0" are acquired as the driver log 112, as shown in FIG. 8, and merged into the final log 128, as shown in FIG. 17. However, when "Acrobad writer 3.0" is registered as a driver name not subjected to job information accumulation processing, the final log is not subjected to accumulation processing, and is not recorded in the server computer 2000. "Acrobad writer" is a data generation program which generates printing or display data of a PDF format, as a preferable example of a driver according to the present invention. The present invention has exemplified "Acrobad writer", but can be applied to any application or device driver which can generate printing or display control data in order to output data to a file serving as a predetermined memory area in the client computer 1001 or a network file server (not shown) serving as an output destination.

The non-processing target database may be set in each of the client computers 1001 to 1003. In this case, whether the port or printer driver is a non-processing target is determined in the job log transmission module 117. In step S2205, the merge log 127 is transmitted to the job log reception module 122. If the client computers 1001 to 1003 perform determination, unnecessary job information need not be transmitted to the server computer 2000, reducing the communication load of the network.

Alternatively, the server computer 2000 may register or delete a non-processing port or printer driver, and transfers information on the determined non-processing port or printer driver to the client computers 1001 to 1003. In this case, the dialogs in FIGS. 20 and 21 are displayed by the server computer 2000, processing shown in the flow chart of FIG. 19 is also executed by the server computer 2000, and processing shown in the flow chart of FIG. 18 is performed by the client computers 1001 to 1003.

When port names or printer driver names are registered/deleted by the server computer 2000 and client computers 1001 to 1003, the port names or printer driver names may be merged.

As has been described above, according to the present invention, a port name or printer driver name not subjected to log accumulation can be registered and compared with the port name or printer driver name of an obtained job log, thus preventing accumulation of a non-processing job log. Accumulation of a log concerning an image forming apparatus which does not support information accumulation and is expected to create an improper log can be prevented, realizing accurate job counting.

This embodiment adopts the non-processing target database 129, and job information on a registered port name or printer driver name is not recorded. The present invention is not limited to this, and the name of a port or printer driver subjected to job information accumulation may be registered in the database. In this case, a final log is recorded when both the port name and printer driver name exist in condition determination processes in steps S2203 and S2205 of FIG. 18.

As described above, this embodiment can increase the job information management precision.

Other Embodiment

A non-processing port name or printer driver name in the embodiment is registered in the registry. A non-processing port name or printer driver name may be registered in a file or database, and the file or database may be accessed in determining whether the port name or printer driver name is to be registered, deleted, or processed.

Processing shown in the flow chart of FIG. 18 in the embodiment and each module shown in FIG. 1B are executed by each computer in accordance with an externally installed program. Pieces of information including the program are supplied to a client computer from a storage medium such as a CD-ROM, flash memory, or FD, or from an external storage medium via a network. Also in this case, the present invention is applied.

The object of the present invention is also achieved when a storage medium which stores software program codes for realizing the functions of the above-described embodiment is supplied to a system or apparatus, or the software program codes are downloaded from an external server (not shown), and the computer (or the CPU or MPU) of the system or apparatus reads out and executes the program codes stored in the storage medium.

In this case, the program codes such as job account server and job account client programs read out from the storage medium realize a new functions of the present invention, and the storage medium which stores the program codes constitutes the present invention. The storage medium for supplying the program codes includes a floppy disk, hard disk, optical disk, magnetooptical disk, DVD, CD-ROM, magnetic tape, nonvolatile memory card, ROM, and EEPROM.

The functions of the above-described embodiment are realized when the computer executes the readout program codes. Also, the functions of the above-described embodiment are realized when an OS (Operating System) or the like running on the computer performs part or all of actual processing on the basis of the instructions of the program codes. Furthermore, the present invention includes a case where, after the program codes transmitted from a predetermined external server apparatus (not shown) via a network or read out from the storage medium are written in the memory of a function expansion board inserted into the computer or the memory of a function expansion unit connected to the computer, the CPU of the function expansion board or function expansion unit performs part or all of actual processing on the basis of the instructions of the program codes and thereby realizes the functions of the above-described embodiment.

As many apparently widely different embodiments of the present invention can be made without departing from the spirit and scope thereof, it is to be understood that the invention is not limited to the specific embodiments thereof except as defined in the appended claims.

What is claimed is:

1. An information processing method of recording or accumulating job log information related to a plurality of jobs issued from a client computer to an image forming apparatus, comprising:

an acquisition step of acquiring the job log information from the client computer or the image forming apparatus, wherein the job log information includes driver information and port information, the driver information identifying a driver program which is performed in the client computer and generates the issued job and the port information identifying a port managed as an output destination of the issued job by the client computer;

a registration step of registering, in a non-recording target database, driver information and port information to specify job log information related to an issued job which is not accompanied by a printout as a condition to identify job log information not to be accumulated in a final log;

a driver information acquisition step of acquiring the driver information from the job log information acquired in the acquisition step;

a port information acquisition step of acquiring the port information from the job log information acquired in the acquisition step;

a determination step of determining whether or not to accumulate the job log information in the final log by using the job log information acquired in the acquisition step, in accordance with a determination as to whether or not at least one of the driver information acquired in the driver information acquisition step and the port information acquired in the port information acquisition step is registered in the non-recording target database; and a merging step of merging into the final log the job log information determined in the determination step to be accumulated, wherein, in the registration step, the driver information related to a driver used for outputting a PDF file to the client computer or an external device is registered in the non-recording target database, and wherein, in the registration step, the port information indicating that a job is output to a device which does not have a printing function is registered in the non-recording target database.

2. The method according to claim 1, wherein the image forming apparatus to which the job log information has been issued is specified in accordance with the port information acquired by the port information acquisition step.

3. The method according to claim 1, wherein, in the merging step, the job log information determined in the determination step to be recorded is recorded in a database in a searchable format.

4. An information processing server which records or accumulates job log information related to a plurality of jobs issued to an image forming apparatus from a client computer connected to a network, comprising:

an acquisition unit constructed to acquire the job log information from the client computer or the image forming apparatus wherein the job log information includes driver information and port information, the driver information identifying a driver program which is performed in the client computer and generates the issued job, and the port information identifying a port managed as an output destination of the issued job by the client computer;

a registration unit constructed to register, in a non-recording target database, driver information and port information to specify job log information related to an issued job which is not accompanied by a printout as a condition to identify job log information not to be accumulated in a final log;

a driver information acquisition unit constructed to acquire the driver information from the job log information acquired from the acquisition unit;

a port information acquisition unit constructed to acquire the port information from the job log information acquired by the acquisition unit;

a determination unit constructed to determine whether or not to accumulate the job log information in the final log by using the job log information acquired by said acquisition unit, in accordance with a determination as to whether or not at least one of the driver which generates data of the issued job and the port information acquired in the port information acquisition unit is registered in the non-recording target database; and a merging unit constructed to merge into the final log the job log information determined by said determination unit to be accumulated, wherein, in the registration unit, the driver information related to a driver used for outputting a PDF file to the client computer or an external device is registered in the non-recording target database, and wherein, in the registration unit, the port information indicating that a job is output to a device which does not have a printing function is registered in the non-recording target database.

5. A computer-readable storage medium storing a computer-executable program for recording or accumulating job log information related to a plurality of jobs issued from a client computer to an image forming apparatus, wherein the program causes a computer to execute:

an acquisition step of acquiring the job log information from the client computer or the image forming apparatus, wherein the job log information includes driver information and port information, the driver information identifying a driver program which is performed in the client computer and generates the issued job and the port information identifying a port managed as an output destination of the issued job by the client computer;

a registration step of registering, in a non-recording target database, driver information and port information to specify job log information related to an issued job which is not accompanied by a printout as a condition to identify job log information not to be accumulated in a final log;

a driver information acquisition step of acquiring the driver information from the job log information acquired in the acquisition step;

a port information acquisition step of acquiring the port information from the job log information acquired in the acquisition step;

a determination step of determining whether or not to accumulate the job log information in the final log by using the job log information acquired in the acquisition step, in accordance with a determination as to whether or not at least one of the driver information acquired in the driver information acquisition step and the port information acquired in the port information acquisition step is registered in the non-recording target database; and a merging step of merging into the final log the job log information determined in the determination step to be accumulated, wherein, in the registration step, the driver information related to a driver used for outputting a PDF file to the client computer or an external device is registered in the non-recording target database, and wherein, in the registration step, the port information indicating that a job is output to a device which does not have a printing function is registered in the non-recording target database.

6. The method according to claim 1, wherein, in the merging step, job log information determined in the determination step to be accumulated is extracted and accumulated from pieces of acquired job log information, and grasp of the number of output pages or charging of an output job is performed.

* * * * *